US012574275B2

(12) United States Patent
Abdelghaffar et al.

(10) Patent No.: US 12,574,275 B2
(45) Date of Patent: Mar. 10, 2026

(54) APERIODIC SOUNDING REFERENCE SIGNAL TRIGGERING WITHOUT DATA SCHEDULING

(71) Applicant: QUALCOMM Incorporated, San Diego, CA (US)

(72) Inventors: Muhammad Sayed Khairy Abdelghaffar, San Jose, CA (US); Huilin Xu, Temecula, CA (US); Runxin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/455,644

(22) Filed: Nov. 18, 2021

(65) Prior Publication Data

US 2022/0231894 A1     Jul. 21, 2022

Related U.S. Application Data

(60) Provisional application No. 63/138,183, filed on Jan. 15, 2021.

(51) Int. Cl.
H04L 27/26 (2006.01)
H04L 5/00 (2006.01)
(Continued)

(52) U.S. Cl.
CPC .......... H04L 27/261 (2013.01); H04L 5/0051 (2013.01); H04W 72/044 (2013.01); H04W 72/23 (2023.01)

(58) Field of Classification Search
CPC ..... H04L 27/261; H04L 5/0051; H04L 5/001; H04L 5/0094; H04L 27/2602; H04W 72/044; H04W 72/23
See application file for complete search history.

(56) References Cited

U.S. PATENT DOCUMENTS

2014/0003262 A1* 1/2014 He .................... H04W 52/0245
370/252
2016/0050057 A1* 2/2016 Kim ..................... H04J 11/0053
370/329
(Continued)

FOREIGN PATENT DOCUMENTS

KR        20210126443 A    10/2021
WO      WO-2021216706      10/2021

OTHER PUBLICATIONS

"Remaining issues on SCell dormancy like behavior"; vivo; 3GPP TSG RAN WG1 #102-e R1-2005359 e-Meeting, Aug. 17-28, 2020 (Year: 2020).*

(Continued)

*Primary Examiner* — Benjamin H Elliott, IV
(74) *Attorney, Agent, or Firm* — QUALCOMM Incorporated

(57)        ABSTRACT
Various aspects of the present disclosure generally relate to wireless communication. In some aspects, a user equipment (UE) may receive, from a base station, a radio resource control (RRC) configuration with one or more high layer parameters that enable one or more of an aperiodic sounding reference signal (SRS) triggering without data scheduling or a secondary cell (SCell) dormancy indication using downlink control information (DCI). The UE may receive, from the base station and based at least in part on the RRC configuration, DCI that is associated with at least one of: the aperiodic SRS triggering without data scheduling or the SCell dormancy indication. The UE may transmit, to the base station, an aperiodic SRS based at least in part on the DCI that triggers the aperiodic SRS. Numerous other aspects are described.

29 Claims, 10 Drawing Sheets

700

710 — Receive, from a base station, a radio resource control (RRC) configuration with one or more high layer parameters that enable one or more of an aperiodic sounding reference signal (SRS) triggering without data scheduling or a secondary cell (SCell) dormancy indication using downlink control information (DCI)

720 — Receive, from the base station and based at least in part on the RRC configuration, DCI that is associated with at least one of: the aperiodic SRS triggering without data scheduling or the SCell dormancy indication 730 — Transmit, to the base station, an aperiodic SRS based at least in part on the DCI that triggers the aperiodic SRS

(51) Int. Cl.
    *H04W 72/044*     (2023.01)
    *H04W 72/23*     (2023.01)

(56)              References Cited

U.S. PATENT DOCUMENTS

| | | | | |
|---|---|---|---|---|
| 2017/0290041 | A1* | 10/2017 | Rico Alvarino | H04W 72/23 |
| 2018/0006788 | A1* | 1/2018 | Lee | H04L 5/001 |
| 2018/0102817 | A1* | 4/2018 | Park | H04B 7/0417 |
| 2018/0123654 | A1* | 5/2018 | Park | H04B 7/0456 |
| 2019/0059001 | A1* | 2/2019 | Yerramalli | H04W 16/14 |
| 2019/0074945 | A1* | 3/2019 | Zhou | H04W 72/20 |
| 2019/0081751 | A1* | 3/2019 | Miao | H04L 5/0048 |
| 2020/0396000 | A1* | 12/2020 | Ryu | H04W 88/14 |
| 2021/0144644 | A1* | 5/2021 | Hsieh | H04W 72/0453 |
| 2021/0336820 | A1* | 10/2021 | Lim | H04W 72/02 |
| 2021/0351827 | A1* | 11/2021 | Hao | H04L 5/0048 |
| 2022/0029861 | A1* | 1/2022 | Shahmohammadian | H04L 5/0048 |
| 2022/0030628 | A1* | 1/2022 | Lunttila | H04L 27/0006 |
| 2022/0123891 | A1* | 4/2022 | Ji | H04L 5/003 |
| 2022/0132534 | A1* | 4/2022 | Jang | H04L 5/0051 |
| 2022/0141662 | A1* | 5/2022 | Liao | H04W 12/08 726/1 |
| 2022/0231894 | A1* | 7/2022 | Abdelghaffar | H04W 72/23 |
| 2022/0232666 | A1* | 7/2022 | Zhou | H04W 52/0206 |
| 2022/0312440 | A1* | 9/2022 | Bagheri | H04W 72/044 |
| 2022/0330161 | A1* | 10/2022 | Abdelghaffar | H04W 72/1263 |
| 2022/0361047 | A1* | 11/2022 | Kahn | H04W 28/24 |
| 2022/0393826 | A1* | 12/2022 | Shi | H04L 5/0051 |
| 2022/0399982 | A1* | 12/2022 | Nory | H04W 72/23 |
| 2023/0122786 | A1* | 4/2023 | Bang | H04W 72/23 370/329 |
| 2023/0164818 | A1* | 5/2023 | Nimbalker | H04L 5/0053 370/329 |
| 2023/0189278 | A1* | 6/2023 | Ying | H04W 72/566 370/329 |
| 2023/0216632 | A1* | 7/2023 | Go | H04L 5/0094 370/329 |
| 2023/0300770 | A1* | 9/2023 | Liu | H04B 7/1853 370/350 |
| 2023/0300806 | A1* | 9/2023 | Haghighat | H04L 5/0053 370/329 |
| 2023/0388076 | A1* | 11/2023 | Yokomakura | H04L 5/0048 |

OTHER PUBLICATIONS

"On maintenance of Scell dormancy and CCS with different SCSs"; Samsung; 3GPP TSG RAN WG1 #102-e R1-2006123 e-Meeting, Aug. 17-28, 2020 (Year: 2020).*
"Enhancements on SRS flexibility, coverage and capacity"; ZTE; 3GPP TSG RAN WG1 Meeting #102-e R1-2006963 eMeeting, Aug. 17-28, 2020 (Year: 2020).*

3GPP TS 38.214: "3rd Generation Partnership Project; Technical Specification Group Radio Access Network; NR; Physical Layer Procedures for Data (Release 16)", 3GPP Draft, DRAFT38214-G40, 3GPP TS 38.214, V16.4.0, (Dec. 2020), 3rd Generation Partnership Project (3GPP), Mobile Competence Centre, 650, Route Des Lucioles, F-06921 Sophia-Antipolis Cedex, France, vol. Jan. 8, 2021 (Jan. 8, 2021), 168 Pages, XP051999688, XP051967567, Retrieved from the Internet: URL: https://ftp.3gpp.org/Specs/archive/38_series/38.214/38214-g40.zip, https://ftp.3gpp.org/Specs/archive/38_series/38.214/38214-g40.zip Draft38214-g40.docx, 38214-g40.docx, [Retrieved on Jan. 8, 2021], Sections 6.1.1.2, 6.2.1 and 6.2.1.3. Section 5.2, Section 5.1.6.5, Section 6.2, Section 6.2.1.
"3rd Generation Partnership Project, Technical Specification Group Radio Access Network, NR, Multiplexing and Channel Coding (Release 16)", 3GPP Standard Technical Specification, 3GPP TS 38.212 (Dec. 2020), 3rd Generation Partnership Project (3GPP), Mobile Competence Centre, 650, Route Des Lucioles, F-06921 Sophia-Antipolis Cedex, France, vol. RAN WG1, No. V16.4.0, Jan. 8, 2021 (Jan. 8, 2021), pp. 1-146, XP051999685, Retrieved from the Internet: URL: https://ftp.3gpp.org/Specs/archive/38_series/38.212/38212-g40.zip 38212-g40.docx. [Retrieved on Jan. 8, 2021], Sections 7.3.1-7.3.1.3.
"3rd Generation Partnership Project, Technical Specification Group Radio Access Network, NR, Physical layer procedures for control (Release 16)", 3GPP Standard Technical Specification, 3GPP TS 38.213, 3rd Generation Partnership Project (3GPP), Mobile Competence Centre, 650, Route Des Lucioles, F-06921 Sophia-Antipolis Cedex, France, vol. RAN WG1, No. V16.4.0, Jan. 8, 2021 (Jan. 8, 2021), pp. 1-181, XP051999687, Retrieved from the Internet: URL: https://ftp.3gpp.org/Specs/archive/38_series/38.213/38213-g40.zip 38213-g40.docx [Retrieved on Jan. 8, 2021], Sections 7.3-7.3.1, 9.1.3.1, 9.2.5 and 10.3.
International Search Report and Written Opinion—PCT/US2021/072522—ISA/EPO—Mar. 18, 2022.
LG Electronics: "Enhancements on SRS Flexibility Coverage and Capacity", 3GPP Draft, 3GPP TSG RAN WG1 #104-e, R1-2100623, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051971094, 7 Pages, Retrieved from the Internet: URL: https://ftp.3gpp.org/tsg_ran/WG1_RL1/TSGR1_104-e/Docs/R1-2100623.zip R1-2100623.Docx. [Retrieved on Jan. 19, 2021], Sections 2-3.
Samsung: "On Maintenance of Scell Dormancy and CCS with Different SCSs", 3GPP Draft, 3GPP TSG RAN WG1 #102-e, R1-2006123, 3rd Generation Partnership Project (3GPP), Mobile Competence Centre, 650, Route Des Lucioles, F-06921 Sophia-Antipolis Cedex, France, vol. Ran WG1, e-Meeting, Aug. 17, 2020-Aug. 28, 2020, Aug. 7, 2020, XP051915182, 6 Pages, Retrieved from the Internet: URL: https://ftp.3gpp.org/tsg_ran/WG1_RL1/TSGR1_102-e/Docs/R1-2006123.zip R1-2006123 On Maintenance of Scell Dormancy and CCS with Different SCSs_final.docx. [Retrieved on Aug. 7, 2021], Sections 2.2-2.2.1, 2.3-2.3.1 and 4.

* cited by examiner

400

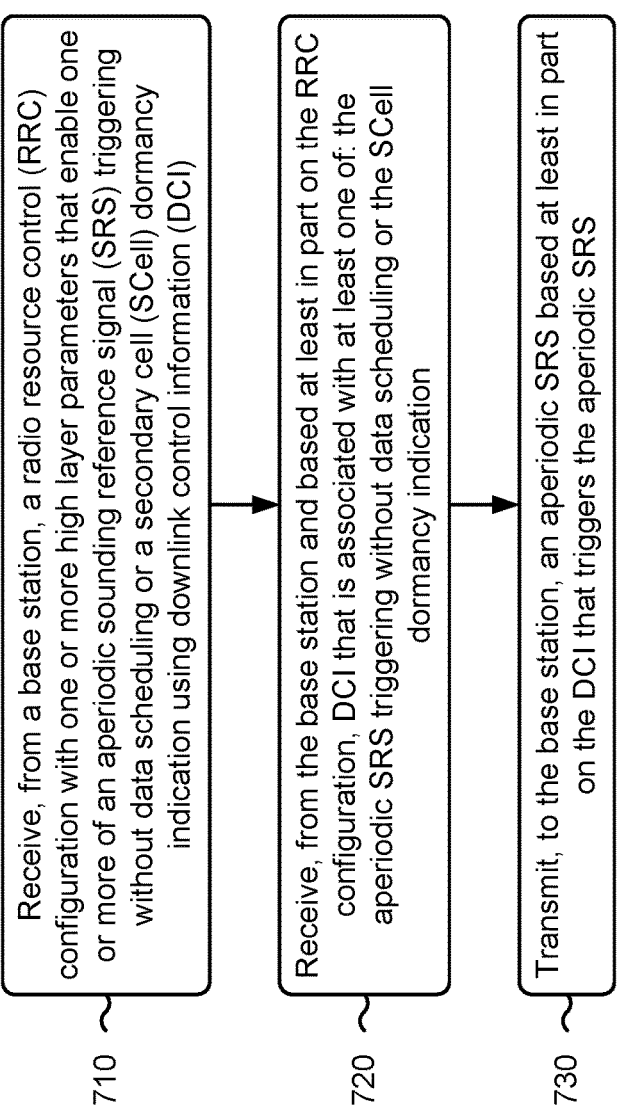

710   Receive, from a base station, a radio resource control (RRC) configuration with one or more high layer parameters that enable one or more of an aperiodic sounding reference signal (SRS) triggering without data scheduling or a secondary cell (SCell) dormancy indication using downlink control information (DCI)

720   Receive, from the base station and based at least in part on the RRC configuration, DCI that is associated with at least one of: the aperiodic SRS triggering without data scheduling or the SCell dormancy indication 730   Transmit, to the base station, an aperiodic SRS based at least in part on the DCI that triggers the aperiodic SRS

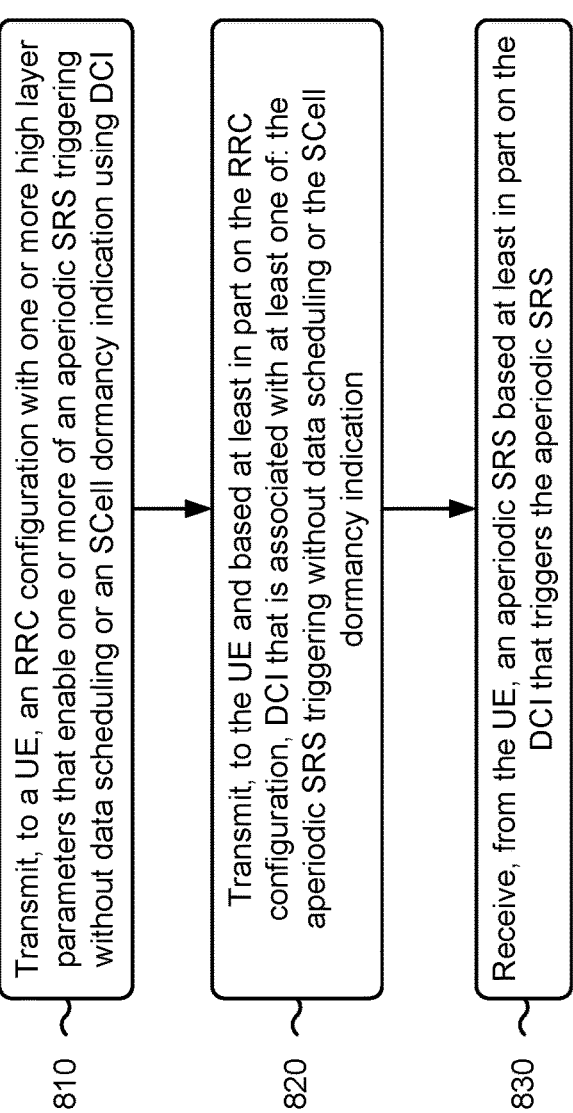

800

810　Transmit, to a UE, an RRC configuration with one or more high layer parameters that enable one or more of an aperiodic SRS triggering without data scheduling or an SCell dormancy indication using DCI 820　Transmit, to the UE and based at least in part on the RRC configuration, DCI that is associated with at least one of: the aperiodic SRS triggering without data scheduling or the SCell dormancy indication 830　Receive, from the UE, an aperiodic SRS based at least in part on the DCI that triggers the aperiodic SRS

FIG. 8

APERIODIC SOUNDING REFERENCE SIGNAL TRIGGERING WITHOUT DATA SCHEDULING

CROSS-REFERENCE TO RELATED APPLICATION

This Patent Application claims priority to U.S. Provisional Patent Application No. 63/138,183, filed on Jan. 15, 2021, entitled "APERIODIC SOUNDING REFERENCE SIGNAL TRIGGERING WITHOUT DATA SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for aperiodic sounding reference signal (SRS) triggering without data scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a UE for wireless communication includes a memory and one or more processors, coupled to the memory, configured to: receive, from a base station, a radio resource control (RRC) configuration with one or more high layer parameters that enable one or more of an aperiodic SRS triggering without data scheduling or a secondary cell (SCell) dormancy indication using downlink control information (DCI); receive, from the base station and based at least in part on the RRC configuration, DCI that is associated with at least one of: the aperiodic SRS triggering without data scheduling or the SCell dormancy indication; and transmit, to the base station, an aperiodic SRS based at least in part on the DCI that triggers the aperiodic SRS.

In some aspects, a base station for wireless communication includes a memory and one or more processors, coupled to the memory, configured to: transmit, to a UE, an RRC configuration with one or more high layer parameters that enable one or more of an aperiodic SRS triggering without data scheduling or an SCell dormancy indication using DCI; transmit, to the UE and based at least in part on the RRC configuration, DCI that is associated with at least one of: the aperiodic SRS triggering without data scheduling or the SCell dormancy indication; and receive, from the UE, an aperiodic SRS based at least in part on the DCI that triggers the aperiodic SRS.

In some aspects, a method of wireless communication performed by a UE includes receiving, from a base station, an RRC configuration with one or more high layer parameters that enable one or more of an aperiodic SRS triggering without data scheduling or an SCell dormancy indication using DCI; receiving, from the base station and based at least in part on the RRC configuration, DCI that is associated with at least one of: the aperiodic SRS triggering without data scheduling or the SCell dormancy indication; and transmitting, to the base station, an aperiodic SRS based at least in part on the DCI that triggers the aperiodic SRS.

In some aspects, a method of wireless communication performed by a base station includes transmitting, to a UE, an RRC configuration with one or more high layer parameters that enable one or more of an aperiodic SRS triggering without data scheduling or an SCell dormancy indication using DCI; transmitting, to the UE and based at least in part on the RRC configuration, DCI that is associated with at least one of: the aperiodic SRS triggering without data scheduling or the SCell dormancy indication; and receiving, from the UE, an aperiodic SRS based at least in part on the DCI that triggers the aperiodic SRS.

In some aspects, a non-transitory computer-readable medium storing a set of instructions for wireless communication includes one or more instructions that, when executed by one or more processors of a UE, cause the UE to: receive, from a base station, an RRC configuration with one or more high layer parameters that enable one or more of an aperiodic SRS triggering without data scheduling or an SCell dormancy indication using DCI; receive, from the base station and based at least in part on the RRC configuration, DCI that is associated with at least one of: the aperiodic SRS triggering without data scheduling or the SCell dormancy indication; and transmit, to the base station, an aperiodic SRS based at least in part on the DCI that triggers the aperiodic SRS.

In some aspects, a non-transitory computer-readable medium storing a set of instructions for wireless communication includes one or more instructions that, when executed by one or more processors of a base station, cause the base station to: transmit, to a UE, an RRC configuration with one or more high layer parameters that enable one or more of an aperiodic SRS triggering without data scheduling or an SCell dormancy indication using DCI; transmit, to the UE and based at least in part on the RRC configuration, DCI that is associated with at least one of: the aperiodic SRS triggering without data scheduling or the SCell dormancy indication; and receive, from the UE, an aperiodic SRS based at least in part on the DCI that triggers the aperiodic SRS.

In some aspects, an apparatus for wireless communication includes means for receiving, from a base station, an RRC configuration with one or more high layer parameters that enable one or more of an aperiodic SRS triggering without data scheduling or an SCell dormancy indication using DCI; means for receiving, from the base station and based at least in part on the RRC configuration, DCI that is associated with at least one of: the aperiodic SRS triggering without data scheduling or the SCell dormancy indication; and means for transmitting, to the base station, an aperiodic SRS based at least in part on the DCI that triggers the aperiodic SRS.

In some aspects, an apparatus for wireless communication includes means for transmitting, to a UE, an RRC configuration with one or more high layer parameters that enable one or more of an aperiodic SRS triggering without data scheduling or an SCell dormancy indication using DCI; means for transmitting, to the UE and based at least in part on the RRC configuration, DCI that is associated with at least one of: the aperiodic SRS triggering without data scheduling or the SCell dormancy indication; and means for receiving, from the UE, an aperiodic SRS based at least in part on the DCI that triggers the aperiodic SRS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating example processes associated with aperiodic SRS triggering without data scheduling, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
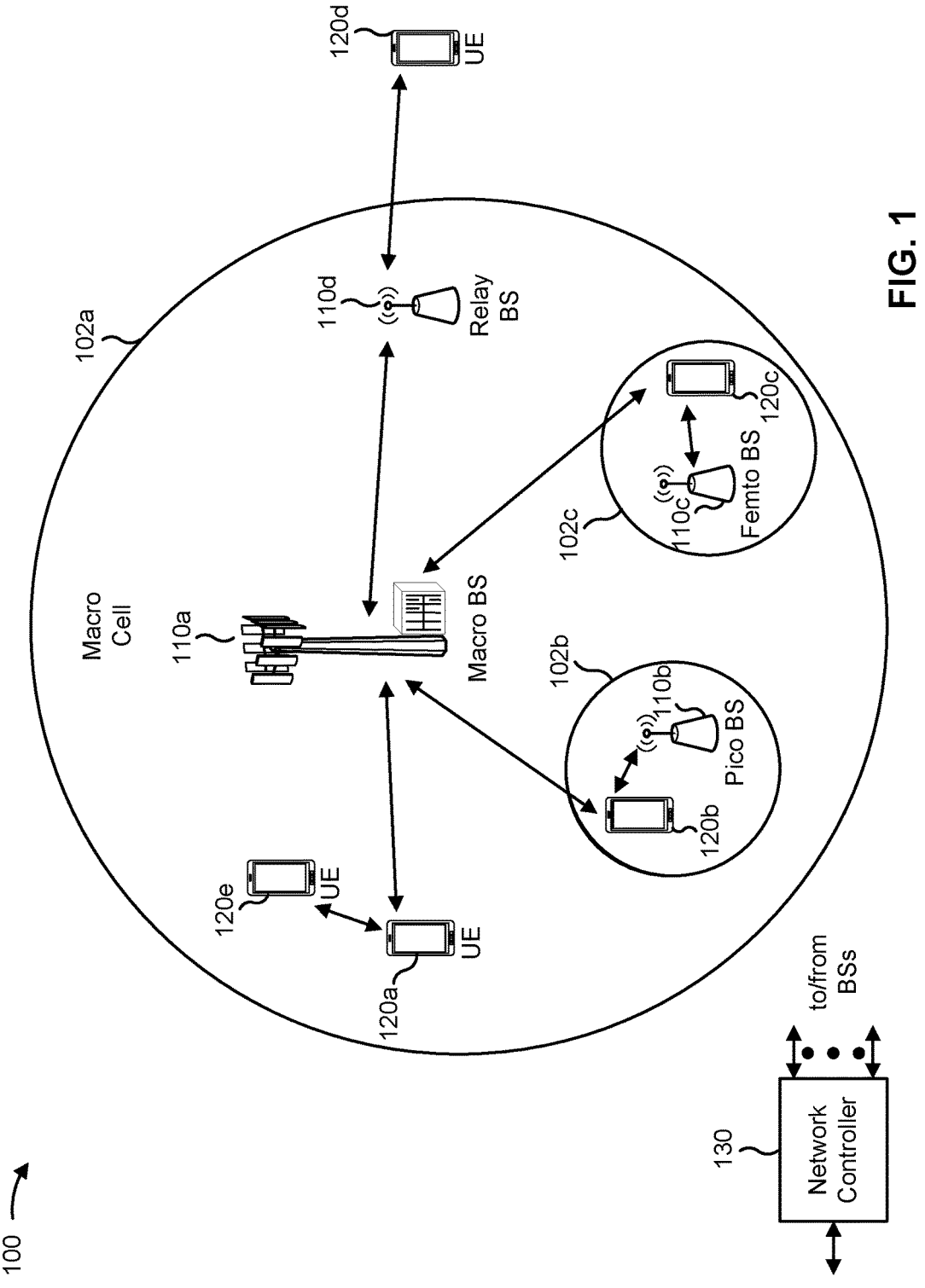
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
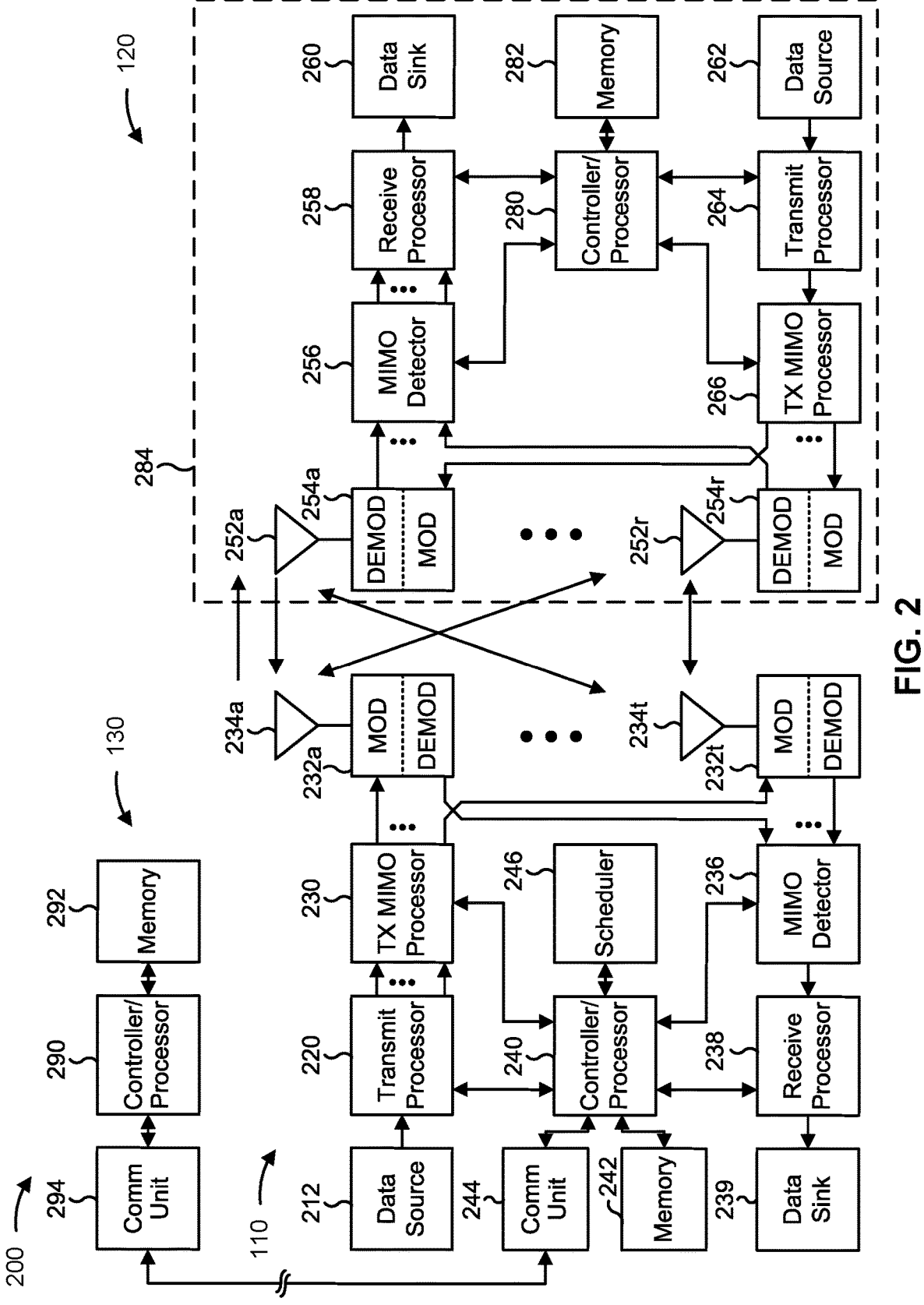
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-8).

The controller/processor 240 of the base station 110, the controller/processor 280 of the UE 120, and/or any other component(s) of FIG. 2 may perform one or more techniques associated with aperiodic SRS triggering without data scheduling, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station, an RRC configuration with one or more high layer parameters that enable one or more of an aperiodic SRS triggering without data scheduling or a secondary cell (SCell) dormancy indication using DCI; means for receiving, from the base station and based at least in part on the RRC configuration, DCI that is associated with at least one of: the aperiodic SRS triggering without data scheduling or the SCell dormancy indication; and/or means for transmitting, to the base station, an aperiodic SRS based at least in part on the DCI that triggers the aperiodic SRS. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, an RRC configuration with one or more high layer parameters that enable one or more of an aperiodic SRS triggering without data scheduling or an SCell dormancy indication using DCI; means for transmitting, to the UE and based at least in part on the RRC configuration, DCI that is associated with at least one of: the aperiodic SRS triggering without data scheduling or the SCell dormancy indication; and/or means for receiving, from the UE, an aperiodic SRS based at least in part on the DCI that triggers the aperiodic SRS. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
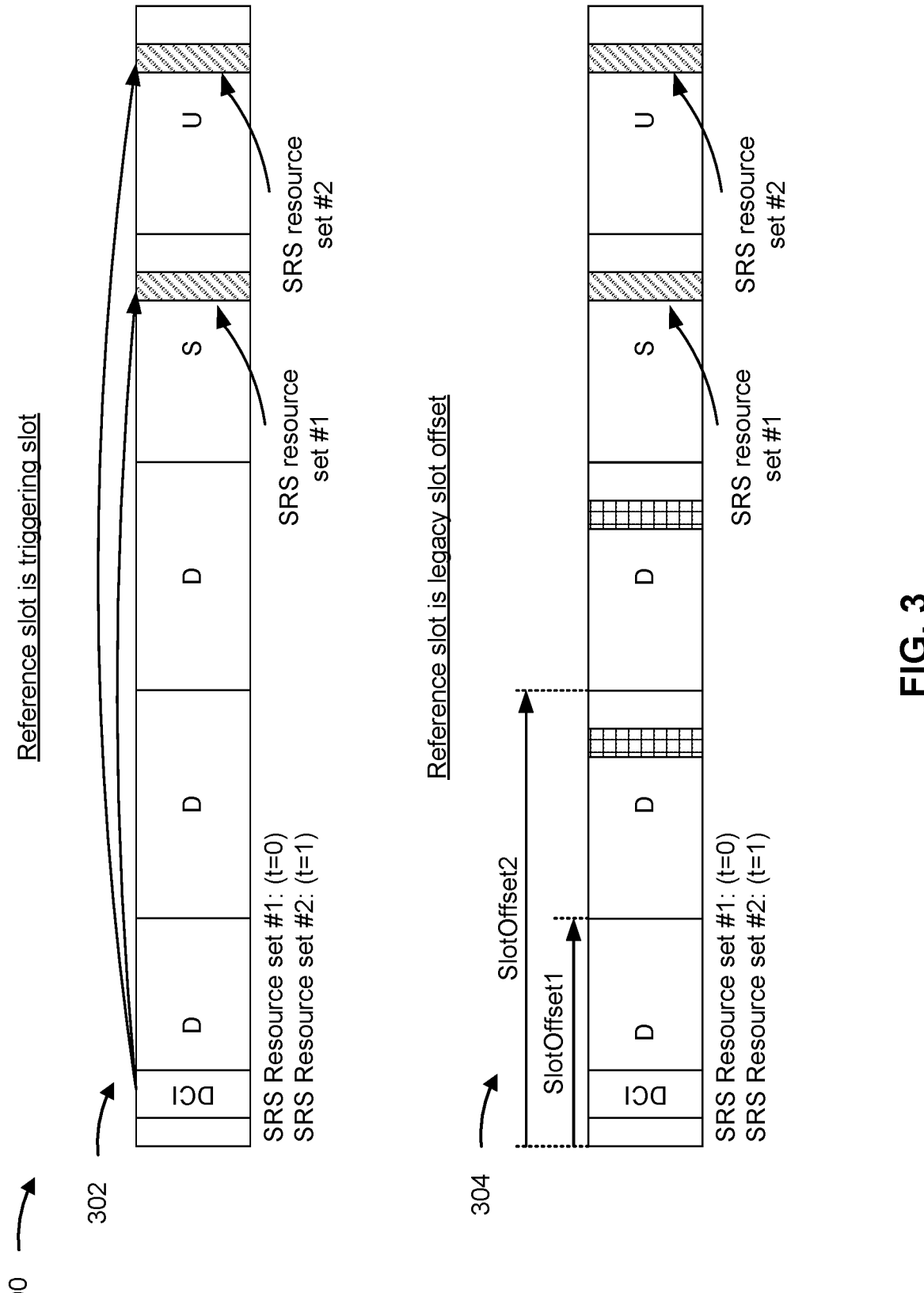
FIG. 3 is a diagram illustrating an example of a triggered aperiodic sounding reference signal (SRS) resource set, in accordance with the present disclosure.

FIG. 3 is a diagram illustrating an example 300 of a triggered aperiodic SRS resource set, in accordance with the present disclosure.

As shown by reference number 302, five consecutive slots may include a first slot that corresponds to a downlink (D) slot, a second slot that corresponds to a downlink slot, a third slot that corresponds to a downlink slot, a fourth slot that corresponds to a special (S) slot, and a fifth slot that corresponds to an uplink (U) slot. Downlink control information (DCI) may be transmitted in the first slot that triggers a first aperiodic SRS resource set and a second aperiodic SRS resource set. The first aperiodic SRS resource set and the second aperiodic SRS resource set may be available in an available slot t, which may be indicated using the DCI and/or radio resource control (RRC) signaling. The available slot t may be later in time as compared to a reference slot. The reference slot may be a DCI triggering slot (e.g., the first slot). In other words, the reference slot may be the first slot. The DCI and/or RRC signaling may indicate that t is zero for the first aperiodic SRS resource set and t is one for the second aperiodic SRS resource set. The first aperiodic SRS resource set may be associated with a first available slot (e.g., based at least in part on t=0) with respect to the reference slot, and the second aperiodic SRS resource set may be associated with a second available slot (e.g., based at least in part on t=1) with respect to the reference slot, where the first available slot may be the fourth slot corresponding to the special slot and the second available slot may be the fifth slot corresponding to the uplink slot.

As shown by reference number 304, the reference slot may be a legacy slot offset, rather than a DCI triggering slot (e.g., the first slot). The first aperiodic SRS resource set may be associated with a first available slot (e.g., corresponding to t=0) in relation to a first slot offset, and the second aperiodic SRS resource set may be associated with a second available slot (e.g., corresponding to t=1) in relation to a second slot offset. The first available slot may be the fourth slot (corresponding to the special slot) and the second available slot may be the fifth slot (corresponding to the uplink slot).

As indicated above, FIG. 3 is provided as an example. Other examples may differ from what is described with regard to FIG. 3.

Figure 4:
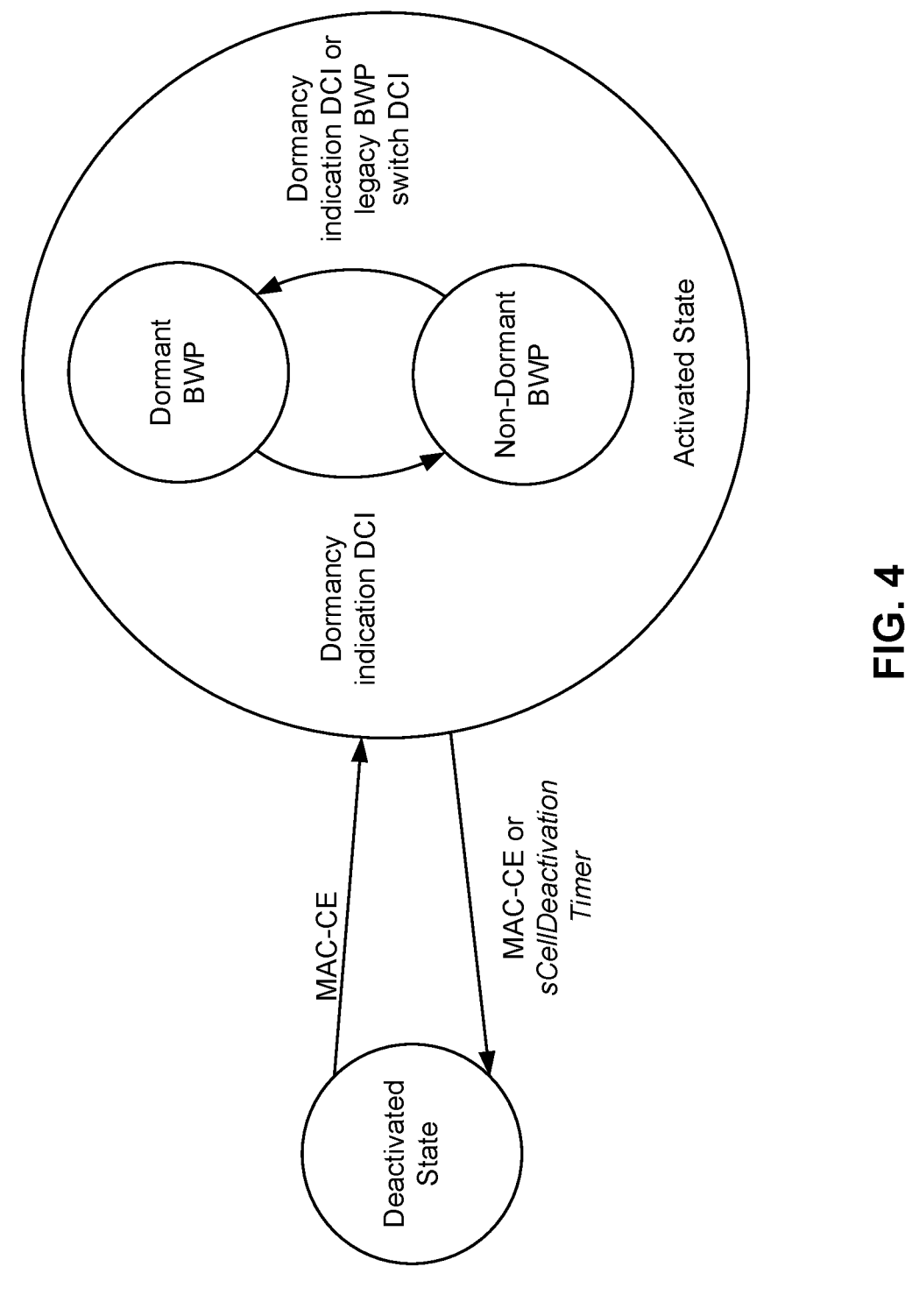
FIG. 4 is a diagram illustrating an example of a secondary cell (SCell) dormancy, in accordance with the present disclosure.

FIG. 4 is a diagram illustrating an example 400 of an SCell dormancy, in accordance with the present disclosure.

As shown in FIG. 4, an SCell may be in an activated state or a deactivated state. While in the activated state, the SCell may be associated with a dormant bandwidth part (BWP) or a non-dormant BWP. The SCell may be associated with the dormant BWP, which may correspond to a sub-state within the SCell activated state for power saving. Physical downlink control channel (PDCCH) monitoring may not be performed for the SCell when the SCell is associated with this sub-state. "Dormant BWP" may refer to a dormant downlink BWP or a dormant uplink BWP. In a dormant downlink BWP, no physical uplink shared channel (PUSCH) may be present. In other words, in the dormant downlink BWP, no DCI monitoring may be performed. The dormant downlink BWP may be associated with channel state information (CSI) reporting and SRS(s). The SCell may switch from the dormant BWP to the non-dormant BWP based at least in part on a dormancy indication DCI. The SCell may switch from the non-dormant BWP to the dormant BWP based at least in part on the dormancy indication DCI or a legacy BWP switch DCI. DCI signaling to transition to/from the dormant BWP may be carried on a primary cell. The DCI signaling may be associated with DCI format 1-1, depending on whether the DCI signaling occurs inside an active time of a UE or outside the active time of the UE.

The SCell may switch from the activated state to the deactivated state. The SCell may switch from the activated state to the deactivated state based at least in part on a medium access control control element (MAC-CE) or an SCell deactivation timer (sCellDeactivationTimer). The SCell may switch from the deactivated state to the activated state based at least in part on a MAC-CE.

As indicated above, FIG. 4 is provided as an example. Other examples may differ from what is described with regard to FIG. 4.

A network may configure one of two cases for a UE based at least in part on whether the UE is within an active time. In a first case, DCI may schedule data and provide an SCell dormancy indication. In the first case, the DCI may be a scheduling DCI, and the data may be uplink data or downlink data. In a second case, DCI may provide the SCell dormancy indication (e.g., the DCI may only provide the SCell dormancy indication). In the second case, the DCI may not schedule data. In other words, in the second case, the DCI may be a non-scheduling DCI.

In the first case, N ($0 \leq N \leq 5$) SCell groups may be configured for the UE, which may cause a minimal increase to DCI size. The SCell dormancy indication may be a bitmap of N bits, each corresponding to one SCell group. The bitmap may be appended to existing fields of DCI format 0_1, 1_1 (e.g., a size of DCI format 0_1, 1_1 may be increased by N bits).

In the second case, an SCell dormancy indication field may be a bitmap of $N_r$ bits, where $N_1$ represents a number of configured SCells for the UE, and each bit in the bitmap may correspond to one configured SCell. One or more fields in a PDCCH may be repurposed for the SCell dormancy indication, such as an MCS field which may include five bits, a new data indicator (NDI) field which may include one bit, a redundancy version (RV) field which may include two bits, a hybrid automatic repeat request (HARQ) process number field which may include four bits, and an antenna port(s) field which may include four bits. The one or more fields may be repurposed in a DCI format 1_1. Further, a DCI size may be aligned with the first case, in which RRC signaling may be used to configure N SCell groups, and N bits may be added to the DCI.

Fall back DCI formats, such as DCI format 0_0 and 1_0, may not be used for the SCell dormancy indication.

Figure 5:
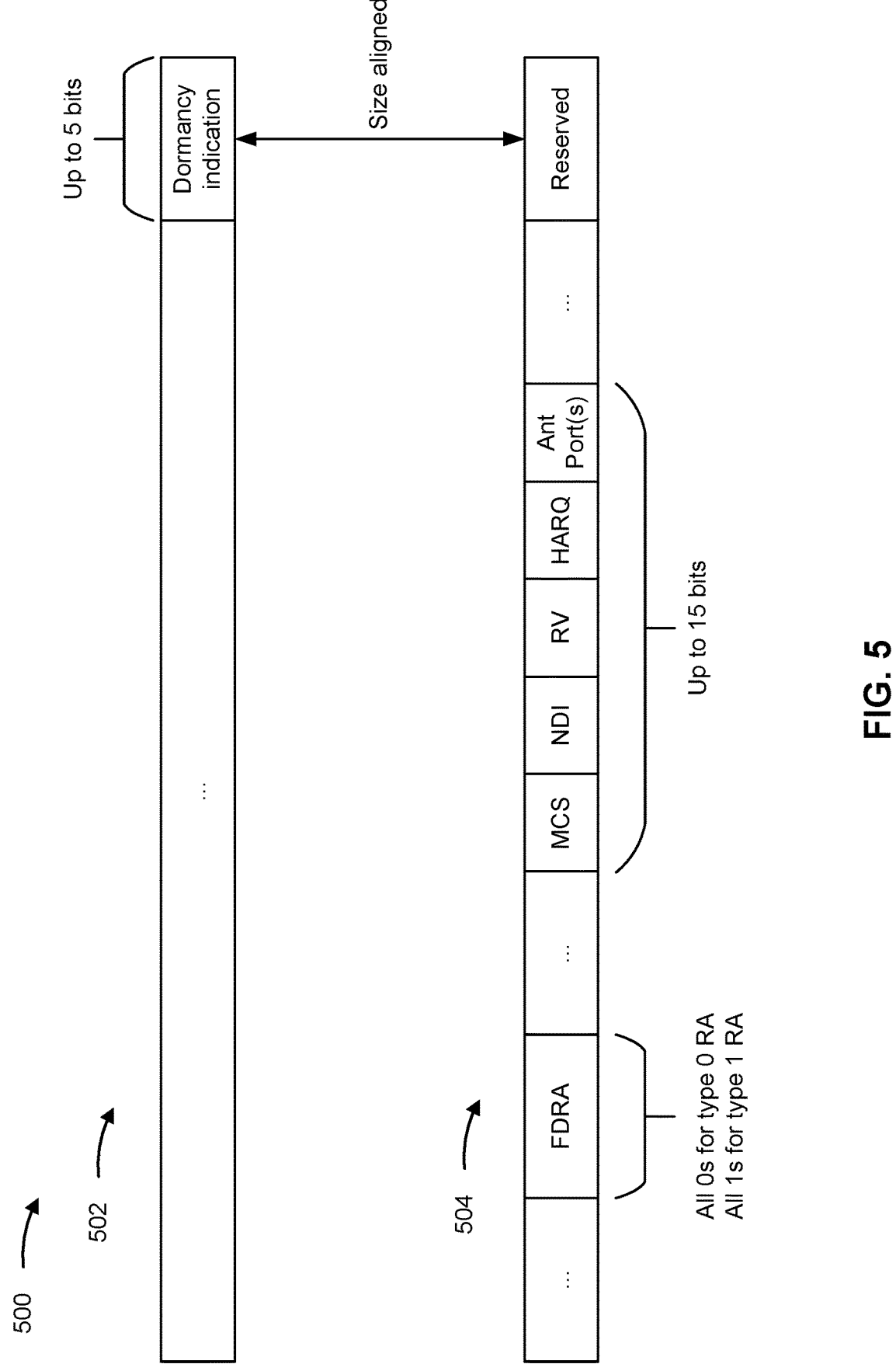
FIG. 5 is a diagram illustrating an example of an SCell dormancy indication, in accordance with the present disclosure.

FIG. 5 is a diagram illustrating an example 500 of an SCell dormancy indication, in accordance with the present disclosure.

As shown by reference number 502, for a first case in which DCI schedules data and provides the SCell dormancy indication, the SCell dormancy indication may be transmitted using up to five bits. The DCI may schedule uplink data or downlink data, and the SCell dormancy indication may be appended to an end of the scheduling DCI.

The SCell dormancy indication may be 0 (zero) bits when a higher layer parameter dormancyGroupWithinActiveTime is not configured, or the SCell dormancy indication may be a one, two, three, four, or five bit bitmap based at least in part on a higher layer parameter dormancyGroupWithinActiveTime, where each bit may correspond to one of the SCell group(s) configured by the higher layer parameter dormancyGroupWithinActiveTime, with a most significant bit (MSB) to a least significant bit (LSB) of the bitmap corresponding to a first to last configured SCell group. A field corresponding to the SCell dormancy indication may be present when a format (e.g., DCI format 1_1) is carried by a PDCCH on a primary cell within a discontinuous reception (DRX) active time and a UE is configured with at least two downlink BWPs for an SCell.

For a second case in which DCI does not schedule data and provides the SCell dormancy indication, DCI format 0_1 may not be used to carry an SCell dormancy indication field, based at least in part on the DCI format 0_1 not providing sufficient unused bits for the SCell dormancy indication field, and/or HARQ acknowledgement (HARQ-ACK) feedback being unable to be directly defined using existing DCI format 0_1 fields.

As shown by reference number 504, for the second case, the SCell dormancy indication may be indicated by repurposing an MCS field, an NDI field, an RV field, a HARQ process number field, and/or an antenna port field (which may use up to 15 bits) in a DCI format 1_1. A network may indicate that the second case is configured based at least in part on invalid frequency domain resource allocation (FDRA) values in the DCI format 1_1, and without using RRC signaling In other words, the network may indicate that the DCI is non-scheduling based at least in part on the invalid FDRA values. An FDRA field in a PDCCH DCI format 1_1 may include is (e.g., may be set to all 1s) based at least in part on a resource allocation (RA) type 1 being used for scheduling. The FDRA field in the PDCCH DCI format 1_1 may include zeros (e.g., may be set to all 0s) based at least in part on an RA type 0 being used for scheduling. Further, for the second case, DCI format 1_1 may not be supported when a DCI cyclic redundancy check (CRC) is scrambled by a configured scheduled radio network temporary identifier (CS-RNTI), since a semi-persistent scheduling (SPS) release DCI may rely on same special values of the FDRA field.

As indicated above, FIG. 5 is provided as an example. Other examples may differ from what is described with regard to FIG. 5.

HARQ-ACK feedback may be supported for a UE to confirm a reception of a PDCCH corresponding to the second case. For a Type 2 codebook (e.g., a dynamic codebook), the UE may transmit an ACK based at least in part on a detection of the PDCCH with the SCell dormancy indication. For a Type 2 codebook (e.g., a semi-static codebook), the UE may not transmit an ACK in response to a detection of the PDCCH with the SCell dormancy indication. Further, when the UE is configured with a carrier indicator field (CIF), DCI format 0_1/1_1 on a primary cell with CIF not equal to zero (CIF≠0) may not be used for an SCell dormancy indication of the first case, in order to avoid a DCI size overhead to cross-carrier data scheduling. DCI format 1_1 on a primary cell with CIF not equal to zero (CIF≠0) may or may not be used for an SCell dormancy indication of the second case, as there is no DCI size overhead or additional blind decoding due to PDCCH decoding.

When requesting a Type-3 HARQ-ACK feedback without scheduling a physical downlink shared channel (PDSCH), no new DCI field may be introduced. For DCI Format 1_1, to signal a Type-3 HARQ-ACK codebook request without scheduling a PDSCH and with a one-shot HARQ-ACK request field with value 1 in a DCI Format 1_1, an all "0" FDRA field for RA type 0 may be used or an all "1" FDRA field for RA type 1 may be used when a dynamic switch resource allocation type is not provided. Alternatively, an all "0" FDRA field or an all "1" FDRA field may be used when a dynamic switch resource allocation type is provided.

In other words, when a one-shot HARQ-ACK request is not present or set to "0", and all bits of an FDRA field are set to zero for RA type 0, or set to one for RA type 1, or set to zero or one for a dynamic switch resource allocation type, a field may be reserved and instead one or more fields may be used for the SCell dormancy indication. The one or more fields may correspond to an MCS field, an NDI field, an RV field, a HARQ process number field, an antenna port field, and/or a DMRS sequence initialization field. Each bit in the one or more fields may correspond to one of the configured SCell(s), with an MSB to an LSB of the one or more fields being concatenated in an order corresponding to an SCell with a lowest to highest SCell index. The one or more fields may be concatenated in the order of the MCS field, the NDI field, the RV field, the HARQ process number field, the antenna port field, and/or the DMRS sequence initialization field.

The DCI format 1_1 may be scrambled by a CS-RNTI, a cell radio network temporary identifier (C-RNTI), or a modulation and coding scheme cell radio network temporary identifier (MCS-C-RNTI).

DCI format 0_1 and 0_2 may trigger aperiodic SRS without data and without CSI. However, in the current design, repurposing of unused fields in DCI format 0_1 and 0_2 for triggering aperiodic SRS is not possible. For example, the repurposing of unused fields in DCI format 0_1 and 0_2 have not been defined for triggering offset(s) and frequency resources for triggering the aperiodic SRS on one or more component carriers.

In various aspects of techniques and apparatuses described herein, a UE may receive, from a base station, an RRC configuration with one or more high layer parameters that enable an aperiodic SRS triggering without data scheduling and/or an SCell dormancy indication using DCI. The UE may receive, from the base station and based at least in part on the RRC configuration, DCI that is associated with at least one of: the aperiodic SRS triggering without data scheduling or the SCell dormancy indication. The DCI may be an uplink DCI or a downlink DCI for aperiodic SRS triggering and the SCell dormancy indication. In other words, the DCI may be a joint SCell dormancy indication and an aperiodic SRS triggering. The UE may transmit, to the base station, an aperiodic SRS based at least in part on the DCI that triggers the aperiodic SRS.

Figure 6:
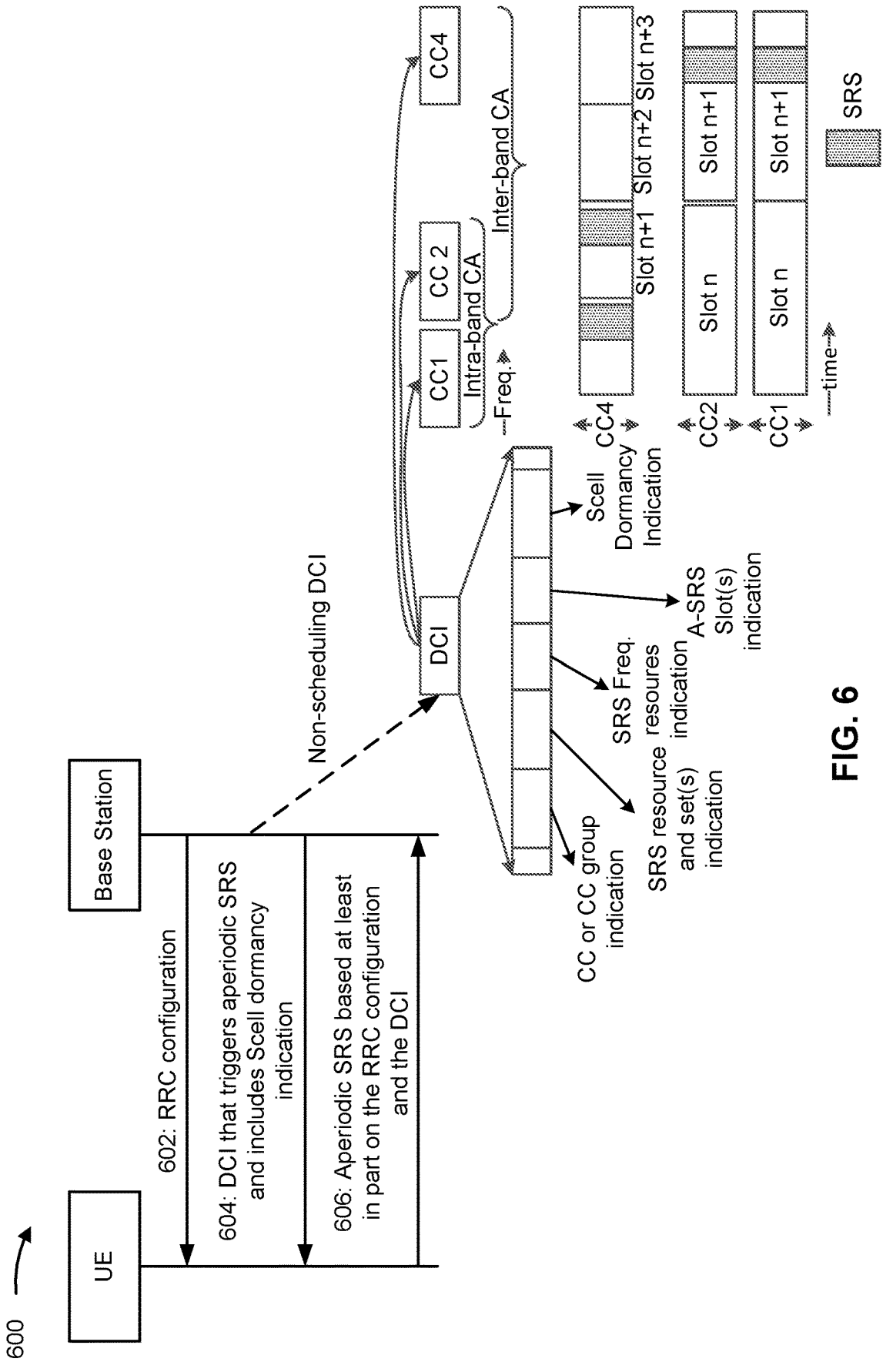
FIG. 6 is a diagram illustrating an example associated with aperiodic SRS triggering without data scheduling, in accordance with the present disclosure.

FIG. 6 is a diagram illustrating an example 600 of aperiodic SRS triggering with an SCell dormancy indication, in accordance with the present disclosure. As shown in FIG. 6, example 600 includes communication between a UE (e.g., UE 120) and a base station (e.g., base station 110). In some aspects, the UE and the base station may be included in a wireless network, such as wireless network 100.

As shown by reference number 602, the UE may receive, from the base station, an RRC configuration with one or more high layer parameters that enable an aperiodic SRS triggering without data scheduling using DCI. The aperiodic SRS triggering without data scheduling may be a flexible aperiodic SRS triggering, in which the aperiodic SRS is triggered without data scheduling using the DCI. The DCI may be a non-scheduling DCI. In other words, the DCI may not schedule uplink data or downlink data. In some aspects, DCI format 1_1 and 1_2 may be used for aperiodic SRS triggering without data and without CSI. The aperiodic SRS triggering may be associated with a licensed band or an unlicensed band.

In some aspects, the one or more high layer parameters included in the RRC configuration may include a Flexi-ble_Aperiodic-SRS_Triggering_DL-DCI parameter, based at least in part on a UE capability to support a feature associated with the Flexible_Aperiodic-SRS_Trig-gering_DL-DCI parameter. A presence of this RRC configuration may be an explicit indication to enable the aperiodic SRS triggering (e.g., a flexible aperiodic SRS triggering) without data scheduling using the DCI formats 1_1 and 1_2. In some aspects, based at least in part on an absence of this RRC configuration, a non-scheduling DCI (e.g., DCI format 1_1) may be used to indicate an SCell dormancy or a New Radio Unlicensed (NR-U) one-shot HARQ-ACK feedback. In other words, when the RRC configuration is enabled or present, the Flexible_Aperiodic-SRS_Triggering_DL-DCI parameter may be an implicit indication that the aperiodic SRS triggering and/or an SCell dormancy indication are supported, depending on a number of available bit fields in the DCI. Further, when the RRC configuration is not enabled, the SCell dormancy indication or the NR-U one shot HARQ-ACK feedback may be supported, but not both.

As shown by reference number 604, the UE may receive, from the base station, DCI that triggers an aperiodic SRS transmission from the UE without data scheduling, and where the DCI may include the SCell dormancy indication. In some aspects, the DCI may be associated with a DCI format 1_1 or a DCI format 1_2. In some aspects, the DCI may trigger the aperiodic SRS transmission and include the SCell dormancy indication based at least in part on a number of available bit fields in the DCI.

In some aspects, the DCI may be a non-scheduling downlink DCI for aperiodic SRS triggering based at least in part on a plurality of "0" values in an FDRA field of the DCI for an RA Type 0 and a plurality of "1" values in an FDRA field of the DCI for RA Type 1 when a dynamic switch resource allocation type is not provided, or based at least in part on a plurality of "0" values or a plurality of "1" values in an FDRA field of the DCI when a dynamic switch resource allocation type is provided. In other words, the base station may provide, to the UE, an indication that the DCI is a non-scheduling downlink DCI for aperiodic SRS trigger-ing based at least in part on all "0" values in an FDRA field for RA type 0 and all "1" values in an FDRA field for RA type 1 when a dynamic switch resource allocation type is not provided, or all "0" values or all "1" values in an FDRA field when a dynamic switch resource allocation type is provided.

In some aspects, the DCI may be associated with an NR-U communication, the aperiodic SRS triggering without data scheduling, and/or the SCell dormancy indication based at least in part on the RRC configuration with the one or more high layer parameters. For example, the DCI may be associated with the NR-U communication based at least in part on a value associated with a one-shot HARQ-ACK field in the DCI.

In some aspects, an existence/configuration of the RRC configuration with the one or more high layer parameters may determine whether the DCI is used for NR-U, aperiodic SRS triggering (or flexible aperiodic SRS triggering), and/or the SCell dormancy indication. For example, when the aperiodic SRS triggering is associated with a higher priority as compared to NR-U and the Flexible_Aperiodic-SR-S_Triggering_DL-DCI parameter is set to "1", the aperiodic SRS triggering without data scheduling may be configured. When the Flexible_Aperiodic-SRS_Triggering_DL-DCI parameter is set to "0" or is not configured, the aperiodic SRS triggering without data scheduling may not be config-ured. In another example, when the NR-U is associated with a higher priority as compared to the aperiodic SRS trigger-ing, NR-U may be enabled when a one-shot HARQ-ACK field is set to "1". Otherwise, when the Flexible_Aperiodic-SRS_Triggering_DL-DCI parameter is set to "1", the ape-riodic SRS triggering (or flexible aperiodic SRS triggering) and/or the SCell dormancy indication may be configured.

In some aspects, the DCI may be a non-scheduling downlink DCI for aperiodic SRS triggering based at least in part on a plurality of values in an antenna port field of the DCI. The base station may provide, to the UE, an indication that the DCI is a non-scheduling downlink DCI for aperiodic SRS triggering based at least in part on other bit fields in the DCI, such as an antenna port field in the DCI in which all values are set to "1" or based at least in part on reserved entries in the DCI.

In some aspects, an FDRA field in the DCI may indicate frequency resources associated with a triggered aperiodic SRS resource set. In other words, the DCI may be used for flexible aperiodic SRS triggering and the FDRA field may be repurposed for indication of other bit fields, or may be used to indicate the frequency resources of the triggered aperiodic SRS resource set(s).

In some aspects, as shown in FIG. 6, the DCI may be a non-scheduling DCI. The DCI may be associated with a component carrier (CC) or CC group indication, an SRS resource and set(s) indication, an SRS frequency resources indication, an aperiodic SRS slot(s) indication, and/or an SCell dormancy indication. The DCI may be associated with multiple CCs, such as CC1, CC2 and CC4. CC1 and CC2 may be associated with an intra-band carrier aggregation. CC2 and CC4 may be associated with an inter-band carrier aggregation. CC1 may include slot n and slot n+1 that includes an SRS. CC2 may include slot n and slot n+1 that includes an SRS. CC4 may include slot n, slot n+1, slot n+2, and slot n+3, where slot n and slot n+1 includes an SRS As shown by reference number 606, the UE may transmit, to the base station, the aperiodic SRS based at least in part on the RRC configuration with the one or more high layer parameters and the DCI that triggers the aperiodic SRS transmission. In other words, the RRC configuration may enable the aperiodic SRS triggering without data scheduling using the DCI, and the DCI may trigger an aperiodic SRS transmission from the UE to the base station.

In some aspects, the aperiodic SRS triggering without data scheduling may be indicated in an MCS field of the DCI (e.g., five bits), an NDI field of the DCI (e.g., one bit), an RV field of the DCI (e.g., two bits), a HARQ process number field of the DCI (e.g., four bits), an antenna port field of the DCI (e.g., four bits), and/or a DMRS sequence initialization field of the DCI (e.g., one bit). In other words, the MCS field, the NDI field, the RV field, the HARQ process number field, the antenna port field, and/or the DMRS sequence initialization field may be repurposed to indicate the aperiodic SRS triggering without data scheduling. In some aspects, the aperiodic SRS triggering without data scheduling may be indicated in a downlink assignment indication (DAI) field of the DCI, a transmit power control (TPC) command for a physical uplink control channel (PUCCH) field of the DCI, a PUCCH resource indicator field of the DCI, and/or a PDSCH-to-HARQ indicator field of the DCI, and these parameters may be related to a PUCCH resource for HARQ ACK feedback.

In some aspects, the aperiodic SRS triggering without data scheduling and the SCell dormancy indication may be indicated using a quantity of bits (e.g., up to 5 bits), and the SCell dormancy indication may be based at least in part on a plurality of SCell groups.

In some aspects, the aperiodic SRS may be associated with a single CC. The single CC may correspond to a CC associated with the DCI. Alternatively, the single CC may not correspond to a CC associated with the DCI. The DCI may indicate an available slot for each triggered aperiodic SRS resource set, a frequency resource of the triggered aperiodic SRS resource set(s), a TPC command, and/or an on-off indication (e.g., a flexible ON/OFF indication) of the triggered aperiodic SRS resource set or of resources within the triggered aperiodic SRS resource set.

In some aspects, the aperiodic SRS may be triggered on one or more CCs (or multiple CCs) associated with one or more SCells. An SCell in the one or more SCells may be a dormant SCell or a non-dormant SCell. In some aspects, the aperiodic SRS may be triggered on a non-dormant SCell (e.g., an indicated non-dormant SCell), and the DCI may switch from a dormant SCell to the non-dormant SCell and trigger the aperiodic SRS on the non-dormant SCell. In some aspects, the aperiodic SRS may be triggered on an SCell irrespective of a dormancy state associated with the SCell. In some aspects, the aperiodic SRS may be triggered on one or more currently active or non-dormant component carriers, and the DCI may not include the SCell dormancy indication. In some aspects, the DCI may indicate a TPC command for each SCell group associated with the one or more SCells, and the DCI may indicate time resources (e.g., an available slot) for the aperiodic SRS for each CC in the one or more CCs.

In some aspects, the aperiodic SRS may be triggered on one or more activated SCells based at least in part on the DCI that switches the dormant SCell to the non-dormant SCell. For example, a DCI for switching SCells to a non-dormant state may implicitly trigger the aperiodic SRS on activated SCells. In other words, the DCI that switches an SCell or a group of SCells into a non-dormant BWP may implicitly trigger the aperiodic SRS at indicated SCell(s).

In some aspects, the DCI may include an aperiodic SRS request, and the aperiodic SRS triggering may cause one or more aperiodic SRS resource sets to be triggered based at least in part on the aperiodic SRS request. In some aspects, the aperiodic SRS triggering may cause an aperiodic SRS resource set to be triggered that corresponds to a downlink CSI acquisition, such as an aperiodic SRS resource set associated with an antenna switching function for the downlink CSI acquisition.

In some aspects, the aperiodic SRS may be transmitted on an SCell associated with a non-dormant BWP, or a target non-dormant BWP, after a BWP switching delay. In some aspects, the aperiodic SRS may be transmitted on an SCell associated with a dormant BWP using a default SRS resource set from a plurality of aperiodic SRS resource sets.

In some aspects, the DCI may be a non-scheduling uplink DCI for the aperiodic SRS triggering, and the aperiodic SRS triggering may be associated with one or more non-dormant or dormant SCells. In some aspects, the DCI may be associated with an uplink DCI format 0_1 or an uplink DCI format 0_2. In some aspects, the DCI may be associated with a joint SCell dormancy indication and the aperiodic SRS triggering. In some aspects, the DCI may be associated with the aperiodic SRS triggering on a plurality of dormant or non-dormant CCs, and the DCI may not indicate or switch a dormancy mode of the CCs. In some aspects, when the DCI is the non-scheduling uplink DCI, one or more bit fields of the DCI may be repurposed to indicate the aperiodic SRS triggering without data scheduling. For example, non-zero bit fields related to data scheduling may be repurposed to indicate the aperiodic SRS triggering without data scheduling. The bit fields of the DCI may include an FDRA field, a time domain resource assignment (TDRA) field, a frequency hopping flag, an MCS field, an NDI field, an RV field, a HARQ process number field, a first DAI field, a second DAI field, a TPC command for a PUCCH field, precoder information and a number of layers information, and/or an antenna port field (e.g., two to five bits).

In some aspects, the DCI may be a scheduling downlink DCI or a scheduling uplink DCI, and the DCI with the SCell dormancy indication may cause the aperiodic SRS triggering on a plurality of non-dormant CCs. In some aspects, the DCI with the SCell dormancy indication may cause the aperiodic SRS triggering on a plurality of activated CCs irrespective of a dormancy state associated with the activated CCs. In other words, an uplink/downlink scheduling DCI format 0_1 and 1_1 with an SCell dormancy indication may implicitly trigger the aperiodic SRS on a group of CCs that are switching to a non-dormant BWP, or on a plurality of CCs that are activated regardless of a BWP mode associated with the plurality of CCs (e.g., dormant or non-dormant BWP).

FIG. 7 is a diagram illustrating an example process 700 performed, for example, by a UE, in accordance with the present disclosure. Example process 700 is an example where the UE (e.g., UE 120) performs operations associated with aperiodic SRS triggering without data scheduling.

As shown in FIG. 7, in some aspects, process 700 may include receiving, from a base station, an RRC configuration with one or more high layer parameters that enable one or more of an aperiodic SRS triggering without data scheduling or an SCell dormancy indication using DCI (block 710). For example, the UE (e.g., using reception component 902, depicted in FIG. 9) may receive, from a base station, an RRC configuration with one or more high layer parameters that enable one or more of an aperiodic SRS triggering without data scheduling or an SCell dormancy indication using DCI, as described above.

As further shown in FIG. 7, in some aspects, process 700 may include receiving, from the base station and based at least in part on the RRC configuration, DCI that is associated with at least one of: the aperiodic SRS triggering without data scheduling or the SCell dormancy indication (block 720). For example, the UE (e.g., using reception component 902, depicted in FIG. 9) may receive, from the base station and based at least in part on the RRC configuration, DCI that is associated with at least one of: the aperiodic SRS triggering without data scheduling or the SCell dormancy indication, as described above.

As further shown in FIG. 7, in some aspects, process 700 may include transmitting, to the base station, an aperiodic SRS based at least in part on the DCI that triggers the aperiodic SRS (block 730). For example, the UE (e.g., using transmission component 904, depicted in FIG. 9) may transmit, to the base station, an aperiodic SRS based at least in part on the DCI that triggers the aperiodic SRS, as described above.

Process 700 may include additional aspects, such as any single aspect or any combination of aspects described below and/or in connection with one or more other processes described elsewhere herein.

In a first aspect, the DCI is associated with a downlink DCI format 1_1 or a downlink DCI format 1_2.

In a second aspect, alone or in combination with the first aspect, the aperiodic SRS triggering is associated with a licensed band.

In a third aspect, alone or in combination with one or more of the first and second aspects, the aperiodic SRS triggering is associated with an unlicensed band.

In a fourth aspect, alone or in combination with one or more of the first through third aspects, the DCI triggers the aperiodic SRS and includes the SCell dormancy indication based at least in part on a number of available bit fields in the DCI.

In a fifth aspect, alone or in combination with one or more of the first through fourth aspects, the DCI is a non-scheduling downlink DCI for the aperiodic SRS triggering based at least in part on a plurality of "0" values in an FDRA field of the DCI for a resource allocation Type 0 and a plurality of "1" values in an FDRA field of the DCI for resource allocation Type 1 when a dynamic switch resource allocation type is not provided, or a plurality of "0" values or a plurality of "1" values in an FDRA field of the DCI when a dynamic switch resource allocation type is provided.

In a sixth aspect, alone or in combination with one or more of the first through fifth aspects, the DCI is associated with one or more of an NR-U communication, the aperiodic SRS triggering without data scheduling, or the SCell dormancy indication based at least in part on the RRC configuration with the one or more high layer parameters.

In a seventh aspect, alone or in combination with one or more of the first through sixth aspects, the DCI is associated with the NR-U communication based at least in part on a value associated with a one-shot hybrid automatic repeat request acknowledgement field in the DCI.

In an eighth aspect, alone or in combination with one or more of the first through seventh aspects, the DCI is a non-scheduling downlink DCI for the aperiodic SRS triggering based at least in part on a plurality of values in an antenna port field of the DCI, and a frequency domain resource assignment field of the DCI indicates frequency resources associated with a triggered aperiodic SRS resource set.

In a ninth aspect, alone or in combination with one or more of the first through eighth aspects, the aperiodic SRS triggering without data scheduling is indicated using one or more of a modulation and coding scheme field of the DCI, a new data indicator field of the DCI, a redundancy version field of the DCI, a HARQ process number field of the DCI, an antenna port field of the DCI, or a demodulation reference signal sequence initialization field of the DCI.

In a tenth aspect, alone or in combination with one or more of the first through ninth aspects, the aperiodic SRS triggering without data scheduling is indicated using one or more of a downlink assignment indication field of the DCI, a transmit power control command for a PUCCH field of the DCI, a PUCCH resource indicator field of the DCI, or a physical downlink shared channel-to-HARQ indicator field of the DCI.

In an eleventh aspect, alone or in combination with one or more of the first through tenth aspects, the aperiodic SRS triggering without data scheduling and the SCell dormancy indication are indicated using a quantity of bits, and the SCell dormancy indication is based at least in part on a plurality of SCell groups.

In a twelfth aspect, alone or in combination with one or more of the first through eleventh aspects, the aperiodic SRS is associated with a single CC, and the single CC corresponds to a CC associated with the DCI.

In a thirteenth aspect, alone or in combination with one or more of the first through twelfth aspects, the aperiodic SRS is associated with a single CC, and the single CC does not correspond to a CC associated with the DCI.

In a fourteenth aspect, alone or in combination with one or more of the first through thirteenth aspects, the DCI indicates one or more of an available slot for each triggered aperiodic SRS resource set, a frequency resource of the triggered aperiodic SRS resource set, a transmit power control command, or an on-off indication of the triggered aperiodic SRS resource set or of resources within the triggered aperiodic SRS resource set.

In a fifteenth aspect, alone or in combination with one or more of the first through fourteenth aspects, the aperiodic SRS is triggered on one or more component carriers associated with one or more SCells, and an SCell in the one or more SCells is a dormant SCell or a non-dormant SCell.

In a sixteenth aspect, alone or in combination with one or more of the first through fifteenth aspects, the aperiodic SRS is triggered on a non-dormant SCell, and the DCI switches a dormant SCell to the non-dormant SCell and triggers the aperiodic SRS on the non-dormant SCell; or wherein the aperiodic SRS is triggered on one or more activated SCells based at least in part on the DCI that switches the dormant SCell to the non-dormant SCell.

In a seventeenth aspect, alone or in combination with one or more of the first through sixteenth aspects, the aperiodic SRS is triggered on an SCell irrespective of a dormancy state associated with the SCell.

In an eighteenth aspect, alone or in combination with one or more of the first through seventeenth aspects, the aperiodic SRS is triggered on one or more currently active or non-dormant component carriers, and the DCI does not include the SCell dormancy indication.

In a nineteenth aspect, alone or in combination with one or more of the first through eighteenth aspects, the aperiodic SRS is triggered on one or more component carriers associated with one or more SCells, the DCI indicates a transmit power control command for each SCell group associated with the one or more SCells, and the DCI indicates time resources for the aperiodic SRS for each component carrier in the one or more component carriers.

In a twentieth aspect, alone or in combination with one or more of the first through nineteenth aspects, the DCI includes an aperiodic SRS request, and the aperiodic SRS triggering causes one or more aperiodic SRS resource sets to be triggered based at least in part on the aperiodic SRS request.

In a twenty-first aspect, alone or in combination with one or more of the first through twentieth aspects, the aperiodic SRS triggering causes an aperiodic SRS resource set to be triggered that corresponds to a downlink channel state information acquisition.

In a twenty-second aspect, alone or in combination with one or more of the first through twenty-first aspects, the aperiodic SRS is transmitted on an SCell associated with a non-dormant BWP after a BWP switching delay.

In a twenty-third aspect, alone or in combination with one or more of the first through twenty-second aspects, the aperiodic SRS is transmitted on an SCell associated with a dormant bandwidth part using a default SRS resource set.

In a twenty-fourth aspect, alone or in combination with one or more of the first through twenty-third aspects, the DCI is associated with an uplink DCI format 0_1 or an uplink DCI format 0_2.

In a twenty-fifth aspect, alone or in combination with one or more of the first through twenty-fourth aspects, the DCI is a non-scheduling uplink DCI for the aperiodic SRS triggering, and the aperiodic SRS triggering is associated with one or more non-dormant or dormant SCells.

In a twenty-sixth aspect, alone or in combination with one or more of the first through twenty-fifth aspects, the DCI is a non-scheduling uplink DCI, and the DCI is associated with a joint SCell dormancy indication and the aperiodic SRS triggering.

In a twenty-seventh aspect, alone or in combination with one or more of the first through twenty-sixth aspects, the DCI is a non-scheduling uplink DCI, and the DCI is associated with the aperiodic SRS triggering on a plurality of dormant or non-dormant component carriers.

In a twenty-eighth aspect, alone or in combination with one or more of the first through twenty-seventh aspects, the DCI is a non-scheduling uplink DCI and the aperiodic SRS triggering without data scheduling is indicated using one or more of a frequency domain resource assignment field of the DCI, a time domain resource assignment field of the DCI, a frequency hopping flag of the DCI, a modulation and coding scheme field of the DCI, a new data indicator field of the DCI, a redundancy version field of the DCI, a hybrid automatic repeat request process number field of the DCI, a first downlink assignment indication field of the DCI, a second downlink assignment indication field of the DCI, a transmit power control command for a physical uplink control channel field of the DCI, precoder information and a number of layers information of the DCI, or an antenna port field of the DCI.

In a twenty-ninth aspect, alone or in combination with one or more of the first through twenty-eighth aspects, the DCI is a scheduling downlink DCI or a scheduling uplink DCI, and the DCI with the SCell dormancy indication causes the aperiodic SRS triggering on a plurality of non-dormant component carriers.

In a thirtieth aspect, alone or in combination with one or more of the first through twenty-ninth aspects, the DCI is a scheduling downlink DCI or a scheduling uplink DCI, and the DCI with the SCell dormancy indication causes the aperiodic SRS triggering on a plurality of activated CCs irrespective of a dormancy state associated with the activated CCs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with aperiodic SRS triggering without data scheduling.

As shown in FIG. 8, in some aspects, process 800 may include transmitting, to a UE, an RRC configuration with one or more high layer parameters that enable one or more of an aperiodic SRS triggering without data scheduling or an SCell dormancy indication using DCI (block 810). For example, the base station (e.g., using transmission component 1004, depicted in FIG. 10) may transmit, to a UE, an RRC configuration with one or more high layer parameters that enable one or more of an aperiodic SRS triggering without data scheduling or an SCell dormancy indication using DCI, as described above.

As further shown in FIG. 8, in some aspects, process 800 may include transmitting, to the UE and based at least in part on the RRC configuration, DCI that is associated with at least one of: the aperiodic SRS triggering without data scheduling or the SCell dormancy indication (block 820). For example, the base station (e.g., using transmission component 1004, depicted in FIG. 10) may transmit, to the UE and based at least in part on the RRC configuration, DCI that is associated with at least one of: the aperiodic SRS triggering without data scheduling or the SCell dormancy indication, as described above.

As further shown in FIG. 8, in some aspects, process 800 may include receiving, from the UE, an aperiodic SRS based at least in part on the DCI that triggers the aperiodic SRS (block 830). For example, the base station (e.g., using reception component 1002, depicted in FIG. 10) may receive, from the UE, an aperiodic SRS based at least in part on the DCI that triggers the aperiodic SRS, as described above.

Process 800 may include additional aspects, such as any single aspect or any combination of aspects described below and/or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
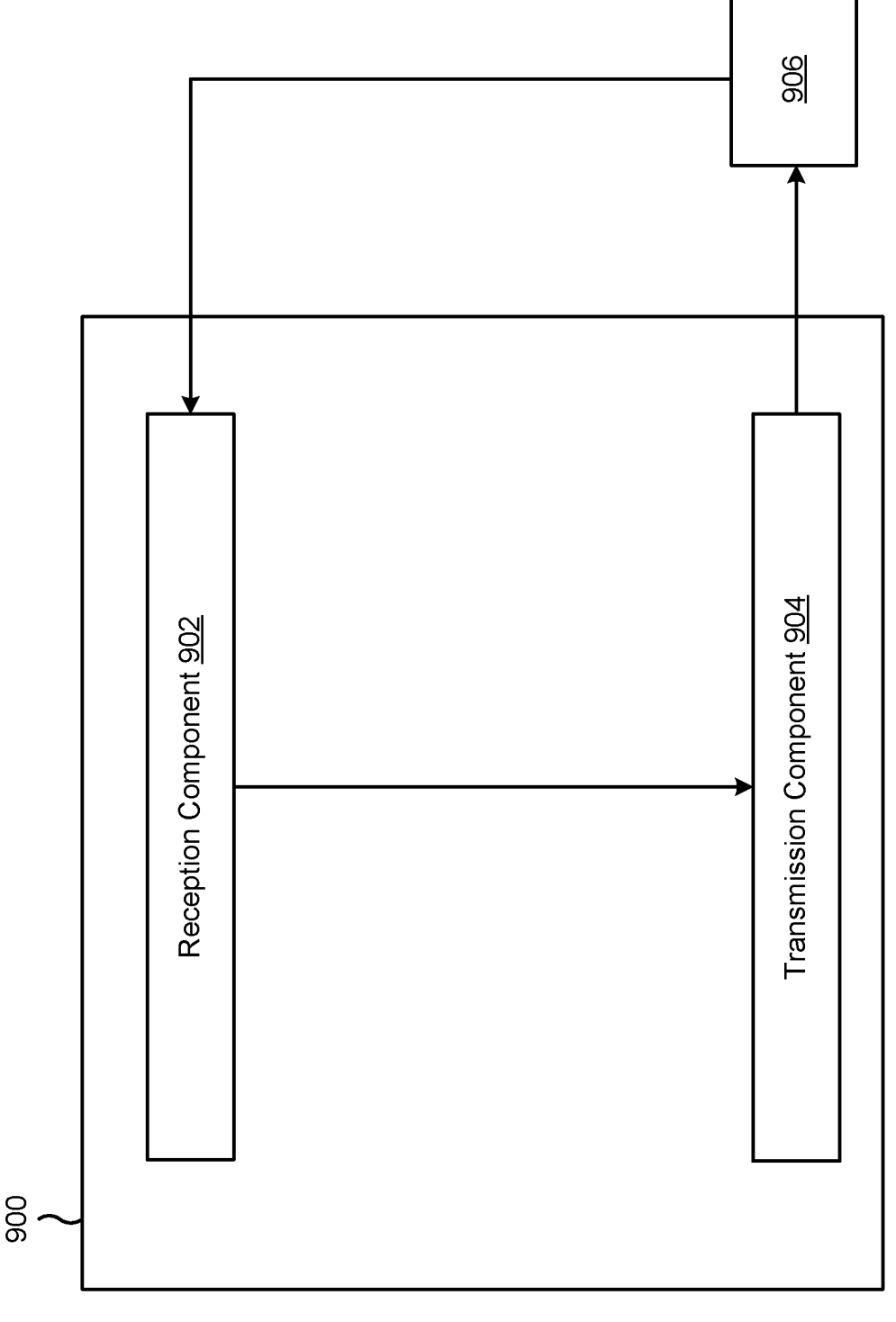
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, an RRC configuration with one or more high layer parameters that enable one or more of an aperiodic SRS triggering without data scheduling or an SCell dormancy indication using DCI. The reception component 902 may receive, from the base station and based at least in part on the RRC configuration, DCI that is associated with at least one of: the aperiodic SRS triggering without data scheduling or the SCell dormancy indication. The transmission component 904 may transmit, to the base station, an aperiodic SRS based at least in part on the DCI that triggers the aperiodic SRS.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
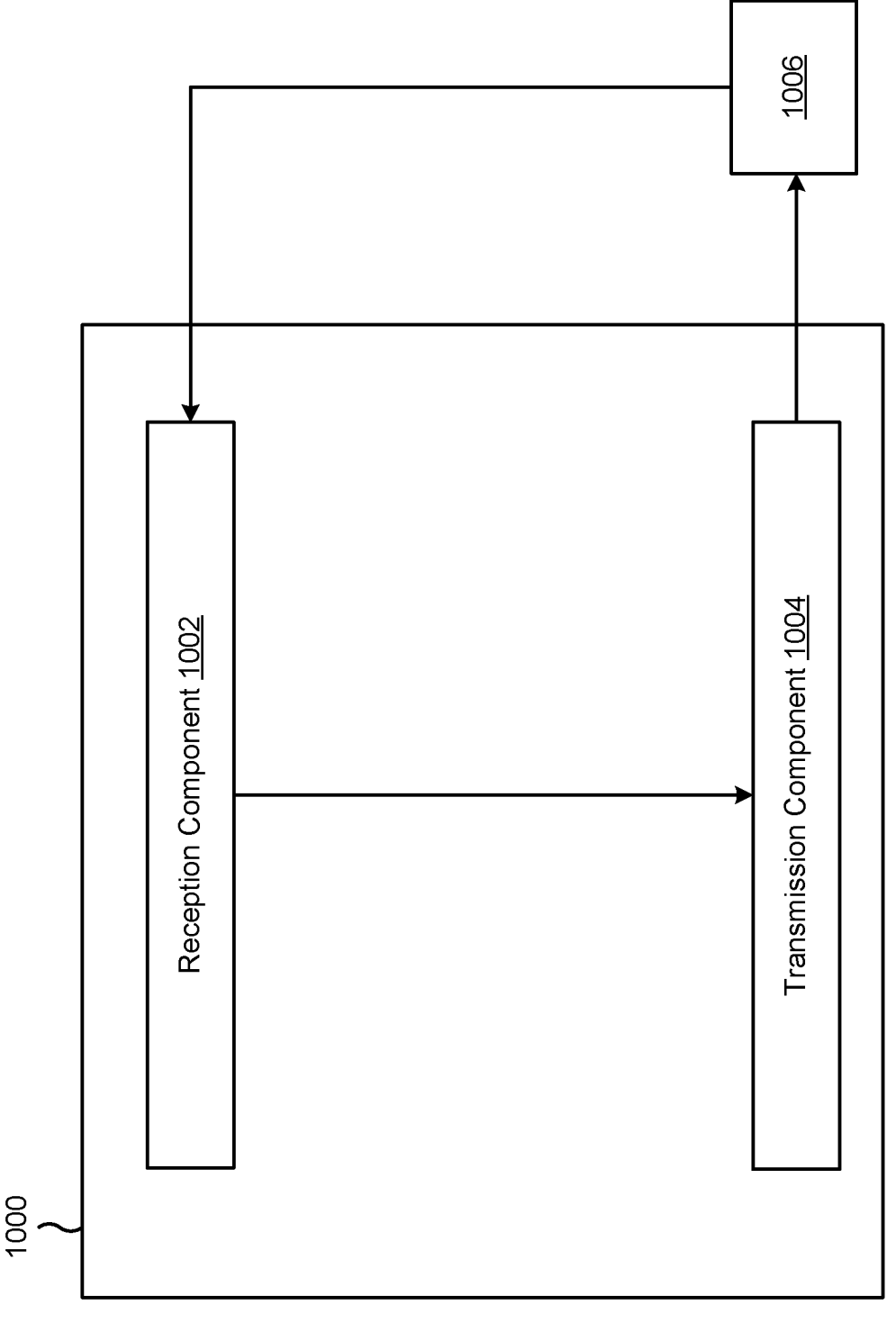

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit, to a UE, an RRC configuration with one or more high layer parameters that enable one or more of an aperiodic SRS triggering without data scheduling or an SCell dormancy indication using DCI. The transmission component 1004 may transmit, to the UE and based at least in part on the RRC configuration, DCI that is associated with at least one of: the aperiodic SRS triggering without data scheduling or the SCell dormancy indication. The reception component 1002 may receive, from the UE, an aperiodic SRS based at least in part on the DCI that triggers the aperiodic SRS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a user equipment (UE), comprising: receiving, from a base station, a radio resource control (RRC) configuration with one or more high layer parameters that enable one or more of an aperiodic sounding reference signal (SRS) triggering without data scheduling or a secondary cell (SCell) dormancy indication using downlink control information (DCI); receiving, from the base station and based at least in part on the RRC configuration, DCI that is associated with at least one of: the aperiodic SRS triggering without data scheduling or the SCell dormancy indication; and transmitting, to the base station, an aperiodic SRS based at least in part on the DCI that triggers the aperiodic SRS.

Aspect 2: The method of aspect 1, wherein the DCI is associated with a downlink DCI format 1_1 or a downlink DCI format 1_2.

Aspect 3: The method of any of aspects 1 through 2, wherein the aperiodic SRS triggering is associated with a licensed band.

Aspect 4: The method of any of aspects 1 through 3, wherein the aperiodic SRS triggering is associated with an unlicensed band.

Aspect 5: The method of any of aspects 1 through 4, wherein the DCI triggers the aperiodic SRS and includes the SCell dormancy indication based at least in part on a number of available bit fields in the DCI.

Aspect 6: The method of any of aspects 1 through 5, wherein the DCI is a non-scheduling downlink DCI for the aperiodic SRS triggering based at least in part on: a plurality of "0" values in a frequency domain resource assignment (FDRA) field of the DCI for a resource allocation Type 0 and a plurality of "1" values in an FDRA field of the DCI for resource allocation Type 1 when a dynamic switch resource allocation type is not provided; or a plurality of "0" values or a plurality of "1" values in an FDRA field of the DCI when a dynamic switch resource allocation type is provided.

Aspect 7: The method of any of aspects 1 through 6, wherein the DCI is associated with one or more of a New Radio Unlicensed (NR-U) communication, the aperiodic SRS triggering without data scheduling, or the SCell dormancy indication based at least in part on the RRC configuration with the one or more high layer parameters.

Aspect 8: The method of aspect 7, wherein the DCI is associated with the NR-U communication based at least in part on a value associated with a one-shot hybrid automatic repeat request acknowledgement field in the DCI.

Aspect 9: The method of any of aspects 1 through 8, wherein the DCI is a non-scheduling downlink DCI for the aperiodic SRS triggering based at least in part on a plurality of values in an antenna port field of the DCI, and wherein a frequency domain resource assignment field of the DCI indicates frequency resources associated with a triggered aperiodic SRS resource set.

Aspect 10: The method of any of aspects 1 through 9, wherein the aperiodic SRS triggering without data scheduling is indicated using one or more of: a modulation and coding scheme field of the DCI, a new data indicator field of the DCI, a redundancy version field of the DCI, a hybrid automatic repeat request process number field of the DCI, an antenna port field of the DCI, or a demodulation reference signal sequence initialization field of the DCI.

Aspect 11: The method of any of aspects 1 through 10, wherein the aperiodic SRS triggering without data scheduling is indicated using one or more of: a downlink assignment indication field of the DCI, a transmit power control command for a physical uplink control channel (PUCCH) field of the DCI, a PUCCH resource indicator field of the DCI, or a physical downlink shared channel-to-hybrid automatic repeat request indicator field of the DCI.

Aspect 12: The method of any of aspects 1 through 11, wherein the aperiodic SRS triggering without data scheduling and the SCell dormancy indication are indicated using a quantity of bits, and wherein the SCell dormancy indication is based at least in part on a plurality of SCell groups.

Aspect 13: The method of any of aspects 1 through 12, wherein the aperiodic SRS is associated with a single component carrier (CC), and the single CC corresponds to a CC associated with the DCI.

Aspect 14: The method of any of aspects 1 through 13, wherein the aperiodic SRS is associated with a single component carrier (CC), and the single CC does not correspond to a CC associated with the DCI.

Aspect 15: The method of any of aspects 1 through 14, wherein the DCI indicates one or more of: an available slot for each triggered aperiodic SRS resource set, a frequency resource of the triggered aperiodic SRS resource set, a transmit power control command, or an on-off indication of the triggered aperiodic SRS resource set or of resources within the triggered aperiodic SRS resource set.

Aspect 16: The method of any of aspects 1 through 15, wherein the aperiodic SRS is triggered on one or more component carriers associated with one or more SCells, and wherein an SCell in the one or more SCells is a dormant SCell or a non-dormant SCell.

Aspect 17: The method of any of aspects 1 through 16, wherein the aperiodic SRS is triggered on a non-dormant SCell, and wherein the DCI switches a dormant SCell to the non-dormant SCell and triggers the aperiodic SRS on the non-dormant SCell; or wherein the aperiodic SRS is triggered on one or more activated SCells based at least in part on the DCI that switches the dormant SCell to the non-dormant SCell.

Aspect 18: The method of any of aspects 1 through 17, wherein the aperiodic SRS is triggered on an SCell irrespective of a dormancy state associated with the SCell.

Aspect 19: The method of any of aspects 1 through 18, wherein the aperiodic SRS is triggered on one or more currently active or non-dormant component carriers, and wherein the DCI does not include the SCell dormancy indication.

Aspect 20: The method of any of aspects 1 through 19, wherein the aperiodic SRS is triggered on one or more component carriers associated with one or more SCells, and wherein the DCI indicates a transmit power control command for each SCell group associated with the one or more SCells, and wherein the DCI indicates time resources for the aperiodic SRS for each component carrier in the one or more component carriers.

Aspect 21: The method of any of aspects 1 through 20, wherein the DCI includes an aperiodic SRS request, and wherein the aperiodic SRS triggering causes one or more aperiodic SRS resource sets to be triggered based at least in part on the aperiodic SRS request.

Aspect 22: The method of any of aspects 1 through 21, wherein the aperiodic SRS triggering causes an aperiodic SRS resource set to be triggered that corresponds to a downlink channel state information acquisition.

Aspect 23: The method of any of aspects 1 through 22, wherein the aperiodic SRS is transmitted on an SCell associated with a non-dormant bandwidth part (BWP) after a BWP switching delay.

Aspect 24: The method of any of aspects 1 through 23, wherein the aperiodic SRS is transmitted on an SCell associated with a dormant bandwidth part using a default SRS resource set.

Aspect 25: The method of any of aspects 1 through 24, wherein the DCI is associated with an uplink DCI format 0_1 or an uplink DCI format 0_2.

Aspect 26: The method of any of aspects 1 through 25, wherein the DCI is a non-scheduling uplink DCI for the aperiodic SRS triggering, and wherein the aperiodic SRS triggering is associated with one or more non-dormant or dormant SCells.

Aspect 27: The method of any of aspects 1 through 26, wherein the DCI is a non-scheduling uplink DCI, and wherein the DCI is associated with a joint SCell dormancy indication and the aperiodic SRS triggering.

Aspect 28: The method of any of aspects 1 through 27, wherein the DCI is a non-scheduling uplink DCI, and wherein the DCI is associated with the aperiodic SRS triggering on a plurality of dormant or non-dormant component carriers.

Aspect 29: The method of any of aspects 1 through 28, wherein the DCI is a non-scheduling uplink DCI and wherein the aperiodic SRS triggering without data scheduling is indicated using one or more of: a frequency domain resource assignment field of the DCI, a time domain resource assignment field of the DCI, a frequency hopping flag of the DCI, a modulation and coding scheme field of the DCI, a new data indicator field of the DCI, a redundancy version field of the DCI, a hybrid automatic repeat request process number field of the DCI, a first downlink assignment indication field of the DCI, a second downlink assignment indication field of the DCI, a transmit power control command for a physical uplink control channel field of the DCI, precoder information and a number of layers information of the DCI, or an antenna port field of the DCI.

Aspect 30: The method of any of aspects 1 through 29, wherein the DCI is a scheduling downlink DCI or a scheduling uplink DCI, and wherein the DCI with the SCell dormancy indication causes the aperiodic SRS triggering on a plurality of non-dormant component carriers.

Aspect 31: The method of any of aspects 1 through 30, wherein the DCI is a scheduling downlink DCI or a scheduling uplink DCI, and wherein the DCI with the SCell dormancy indication causes the aperiodic SRS triggering on a plurality of activated component carriers (CCs) irrespective of a dormancy state associated with the activated CCs.

Aspect 32: A method of wireless communication performed by a base station, comprising: transmitting, to a user equipment (UE), a radio resource control (RRC) configuration with one or more high layer parameters that enable one or more of an aperiodic sounding reference signal (SRS) triggering without data scheduling or a secondary cell (SCell) dormancy indication using downlink control information (DCI); transmitting, to the UE and based at least in part on the RRC configuration, DCI that is associated with at least one of: the aperiodic SRS triggering without data scheduling or the SCell dormancy indication; and receiving, from the UE, an aperiodic SRS based at least in part on the DCI that triggers the aperiodic SRS.

Aspect 33: An apparatus for wireless communication at a device, comprising a processor; memory coupled with the processor; and instructions stored in the memory and executable by the processor to cause the apparatus to perform the method of one or more aspects of aspects 1-31.

Aspect 34: A device for wireless communication, comprising a memory and one or more processors coupled to the memory, the memory and the one or more processors configured to perform the method of one or more aspects of aspects 1-31.

Aspect 35: An apparatus for wireless communication, comprising at least one means for performing the method of one or more aspects of aspects 1-31.

Aspect 36: A non-transitory computer-readable medium storing code for wireless communication, the code comprising instructions executable by a processor to perform the method of one or more aspects of aspects 1-31.

Aspect 37: A non-transitory computer-readable medium storing a set of instructions for wireless communication, the set of instructions comprising one or more instructions that, when executed by one or more processors of a device, cause the device to perform the method of one or more aspects of aspects 1-31.

Aspect 38: An apparatus for wireless communication at a device, comprising a processor; memory coupled with the processor; and instructions stored in the memory and executable by the processor to cause the apparatus to perform the method of aspect 32.

Aspect 39: A device for wireless communication, comprising a memory and one or more processors coupled to the memory, the memory and the one or more processors configured to perform the method of aspect 32.

Aspect 40: An apparatus for wireless communication, comprising at least one means for performing the method of aspect 32.

Aspect 41: A non-transitory computer-readable medium storing code for wireless communication, the code comprising instructions executable by a processor to perform the method of aspect 32.

Aspect 42: A non-transitory computer-readable medium storing a set of instructions for wireless communication, the set of instructions comprising one or more instructions that, when executed by one or more processors of a device, cause the device to perform the method of aspect 32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element(e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, individually or collectively coupled to the one or more memories, configured to:
transmit, to a network entity, a capability, of the UE, associated with supporting an aperiodic sounding reference signal (SRS);
receive, from the network entity and based at least in part on transmitting the capability, a radio resource control (RRC) configuration with one or more higher layer parameters associated with triggering the aperiodic SRS, wherein the aperiodic SRS is triggered on one or more non-dormant component carriers;
receive, from the network entity and based at least in part on the RRC configuration, a non-scheduling uplink downlink control information (DCI) that has an uplink DCI format 01 or an uplink DCI format 02 and that includes an aperiodic SRS request triggering the aperiodic SRS without an associated uplink data scheduling grant and without channel state information; and
transmit, to the network entity, the aperiodic SRS based at least in part on the non-scheduling uplink DCI.

2. The UE of claim 1, wherein the aperiodic SRS is associated with a licensed band or an unlicensed band.

3. The UE of claim 1, wherein the non-scheduling uplink DCI triggers the aperiodic SRS based at least in part on a number of available bit fields in the non-scheduling uplink DCI.

4. The UE of claim 1, wherein the non-scheduling uplink DCI is based at least in part on:
a plurality of "0" values in a frequency domain resource assignment (FDRA) field of the non-scheduling uplink DCI for a resource allocation Type 0 and a plurality of "1" values in an FDRA field of the non-scheduling uplink DCI for resource allocation Type 1 when a dynamic switch resource allocation type is not provided; or
a plurality of "0" values or a plurality of "1" values in an FDRA field of the non-scheduling uplink DCI when the dynamic switch resource allocation type is provided.

5. The UE of claim 1, wherein the non-scheduling uplink DCI is associated with a New Radio Unlicensed (NR-U) communication based at least in part on a value associated with a one-shot hybrid automatic repeat request acknowledgement field in the non-scheduling uplink DCI.

6. The UE of claim 1, wherein the non-scheduling uplink DCI is based at least in part on a plurality of values in an antenna port field of the non-scheduling uplink DCI, and wherein a frequency domain resource assignment field of the non-scheduling uplink DCI indicates frequency resources associated with a triggered aperiodic SRS resource set.

7. The UE of claim 1, wherein the non-scheduling uplink DCI includes an indicator indicating the aperiodic SRS.

8. The UE of claim 7, wherein the indicator comprises one or more of: a downlink assignment indication field, a PUCCH resource indicator field, or a physical downlink shared channel-to-hybrid automatic repeat request indicator field.

9. The UE of claim 7, wherein the indicator comprises a quantity of bits.

10. The UE of claim 1, wherein the aperiodic SRS is associated with a single component carrier (CC), and the single CC corresponds to a CC associated with the non-scheduling uplink DCI.

11. The UE of claim 1, wherein the aperiodic SRS is associated with a single component carrier (CC), and the single CC does not correspond to a CC associated with the non-scheduling uplink DCI.

12. The UE of claim 1, wherein the non-scheduling uplink DCI indicates one or more of: an available slot for a triggered aperiodic SRS resource set, a frequency resource of the triggered aperiodic SRS resource set, a transmit power control command, or an on-off indication of the triggered aperiodic SRS resource set or of resources within the triggered aperiodic SRS resource set.

13. The UE of claim 1, wherein the one or more non-dormant component carriers is associated with one or more secondary cells (SCells), and wherein an SCell in the one or more SCells is a dormant SCell or a non-dormant SCell.

14. The UE of claim 1, wherein the aperiodic SRS is triggered on a non-dormant secondary cell (SCell), and wherein the non-scheduling uplink DCI switches a dormant SCell to the non-dormant SCell and triggers the aperiodic SRS on the non-dormant SCell; or wherein the aperiodic SRS is triggered on one or more activated SCells based at least in part on the non-scheduling uplink DCI that switches the dormant SCell to the non-dormant SCell.

15. The UE of claim 1, wherein the aperiodic SRS is triggered on a secondary cell (SCell) irrespective of a dormancy state associated with the SCell.

16. The UE of claim 1, wherein the one or more non-dormant component carriers is associated with one or more secondary cells (SCells), and wherein the non-scheduling uplink DCI indicates:
a transmit power control command for each SCell group associated with the one or more SCells, and time resources for the aperiodic SRS for the one or more non-dormant component carriers.

17. The UE of claim 1, wherein:

an aperiodic SRS resource set, corresponding to a downlink channel state information acquisition, is to be triggered based at least in part on triggering the aperiodic SRS; or the aperiodic SRS is transmitted on a secondary cell (SCell) associated with a non-dormant bandwidth part (BWP) after a BWP switching delay.

18. The UE of claim 1, wherein the aperiodic SRS is transmitted on a secondary cell (SCell) associated with a dormant bandwidth part using a default SRS resource set.

19. The UE of claim 8, indicator comprises one or more of: a frequency domain resource assignment field, a time domain resource assignment field, a frequency hopping flag, a modulation and coding scheme field, a new data indicator field, a redundancy version field, a hybrid automatic repeat request process number field, a downlink assignment indication field a physical uplink control channel field or an antenna port field.

20. The UE of claim 1, wherein one or more aperiodic SRS resource sets are to be triggered based at least in part on triggering the aperiodic SRS request.

21. The UE of claim 9, wherein the quantity of bits is a single bit.

22. A network entity for wireless communication, comprising:

one or more memories; and one or more processors, individually or collectively coupled to the one or more memories, configured to:

receive, from a user equipment (UE) a capability, of the UE, associated with supporting an aperiodic sounding reference signal (SRS);

transmit, to the UE and based at least in part on receiving the capability, a radio resource control (RRC) configuration with one or more higher layer parameters associated with triggering the aperiodic SRS, wherein the aperiodic SRS is triggered on one or more non-dormant component carriers;

transmit, to the UE and based at least in part on the RRC configuration, a non-scheduling uplink downlink control information (DCI) that has an uplink DCI format 01 or an uplink DCI format 02 and that includes an aperiodic SRS request triggering the aperiodic SRS without an associated uplink data scheduling grant and without channel state information; and receive, from the UE, the aperiodic SRS based at least in part on the non-scheduling uplink DCI.

23. The network entity of claim 22, wherein the aperiodic SRS is indicated using a plurality of non-zero bit fields of the non-scheduling uplink DCI.

24. The network entity of claim 22, wherein one or more aperiodic SRS resource sets are to be triggered based at least in part on the aperiodic SRS request.

25. A method of wireless communication performed by a user equipment (UE), comprising:

transmitting, to a network entity, a capability, of the UE, associated with supporting an aperiodic sounding reference signal (SRS);

receiving, from the network entity and based at least in part on transmitting the capability, a radio resource control (RRC) configuration with one or more higher layer parameters associated with triggering the aperiodic SRS, wherein the aperiodic SRS is triggered on one or more non-dormant component carriers;

receiving, from the network entity and based at least in part on the RRC configuration, a non-scheduling uplink downlink control information (DCI) that has an uplink DCI format 01 or an uplink DCI format 02 and that includes an aperiodic SRS request triggering the aperiodic SRS without an associated uplink data scheduling grant and without channel state information; and transmitting, to the network entity, the aperiodic SRS based at least in part on the non-scheduling uplink DCI.

26. The method of claim 25, wherein the non-scheduling uplink DCI includes an indicator indicating the aperiodic SRS.

27. The method of claim 25, wherein the aperiodic SRS is associated with a single component carrier (CC).

28. The method of claim 25, wherein the aperiodic SRS is associated with a licensed band or an unlicensed band.

29. A method of wireless communication performed by a network entity, comprising:

receiving, from a user equipment (UE), a capability, of the UE, associated with supporting an aperiodic sounding reference signal (SRS);

transmitting, to the UE and based at least in part on receiving the capability, a radio resource control (RRC) configuration with one or more higher layer parameters associated with triggering the aperiodic SRS, wherein the aperiodic SRS is triggered on one or more non-dormant component carriers;

transmitting, to the UE and based at least in part on the RRC configuration, a non-scheduling uplink downlink control information (DCI) that has an uplink DCI format 01 or an uplink DCI format 02 and that includes an aperiodic SRS request triggering the aperiodic SRS without an associated uplink data scheduling grant and without channel state information; and receiving, from the UE, an aperiodic SRS based at least in part on the non-scheduling uplink DCI.

* * * * *